No. 707,154. Patented Aug. 19, 1902.
J. A. NORTH.
FRUIT STEMMER.
(Application filed Aug. 26, 1901.)
(No Model.) 2 Sheets—Sheet 1.
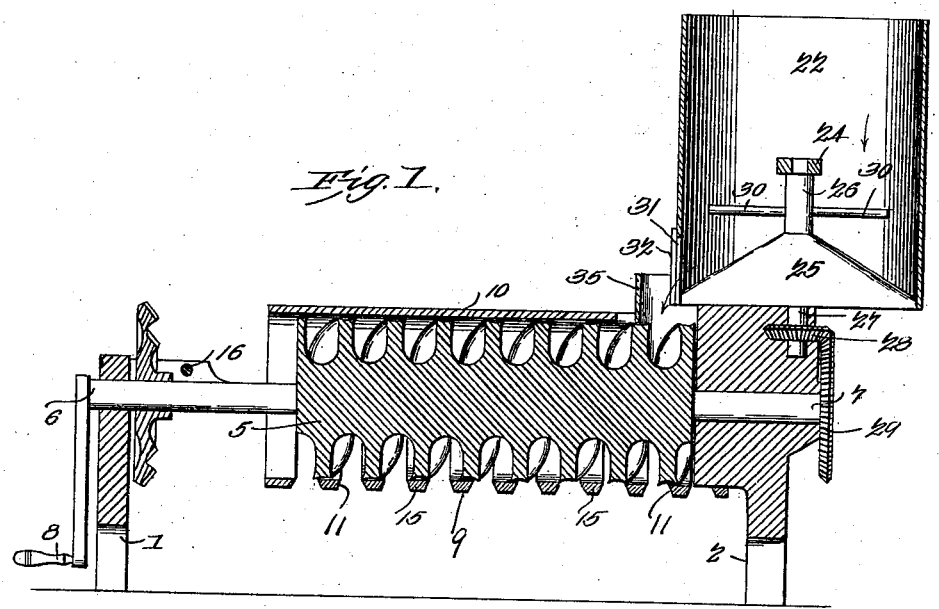
Witnesses
James A. North, Inventor
by
Attorneys No. 707,154. Patented Aug. 19, 1902.
J. A. NORTH.
FRUIT STEMMER.
(Application filed Aug. 26, 1901.)
(No Model.) 2 Sheets—Sheet 2.

Witnesses
James A. North, Inventor.
by C. A. Snow & Co.
Attorneys.

UNITED STATES PATENT OFFICE.

JAMES A. NORTH, OF LOWRY CITY, MISSOURI.

FRUIT-STEMMER.

SPECIFICATION forming part of Letters Patent No. 707,154, dated August 19, 1902.

Application filed August 26, 1901. Serial No. 73,360. (No model.)

*To all whom it may concern:*

Be it known that I, JAMES A. NORTH, a citizen of the United States, residing at Lowry City, in the county of St. Clair and State of Missouri, have invented a new and useful Fruit-Stemmer, of which the following is a specification.

This invention relates to machines for stemming fruit, and has for its object to provide an improved machine of this character which is especially adapted for use in stemming gooseberries.

It is furthermore designed to arrange for the convenient manipulation of the device, to facilitate the feeding of the berries to the machine, and to insure the cutting of the stems from the berries without damaging the fruit, the stems being immediately discharged and the fruit carried to the end of the machine, where they are discharged independently of the stems, thereby effectually separating the stems and the stemmed fruit.

With these and other objects in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

Figure 3:
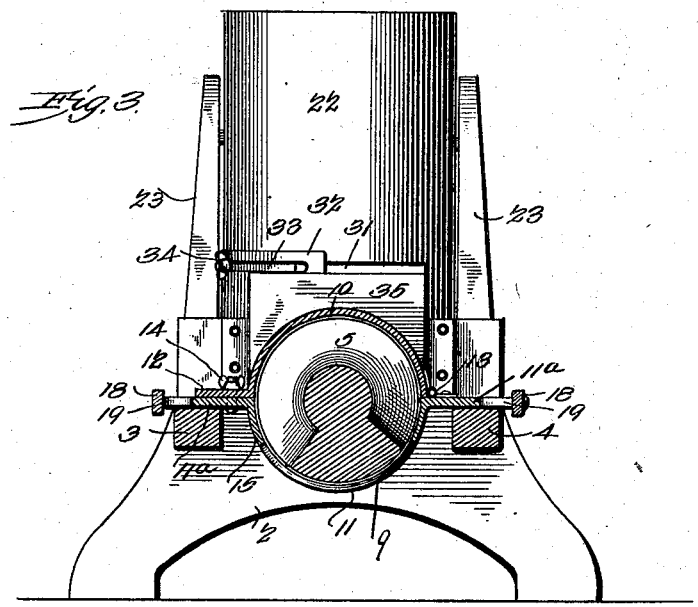
Figure 4:
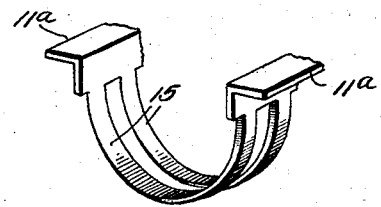

In the drawings, Figure 1 is a central longitudinal sectional view of a fruit-stemming machine constructed in accordance with the present invention. Fig. 2 is a top plan view thereof, the hopper being shown in horizontal section. Fig. 3 is a cross-sectional view on the line 3 3 of Fig. 2. Fig. 4 is a detail perspective view of a portion of the reciprocatory stem-cutting device.

Like characters of reference designate corresponding parts in all of the figures of the drawings.

In carrying out the invention there is provided a supporting frame structure, consisting of the end pieces 1 and 2 and the opposite longitudinal side pieces or bars 3 and 4.
In the middle of this open frame there is located a rotatable spirally-grooved feed-roller 5, which has the opposite journals 6 and 7, which are mounted in the respective ends of the frame. The spiral flanges formed by the spiral groove have their outer edges grooved to form opposite cutting edges, as will be seen by reference to Figs. 1 and 2. At that end of the feed-spiral which is adjacent to the end piece 1 there is provided an operating crank-handle 8, applied to the outer end of the journal 6 for manipulating the machine by hand. The spiral feed device rotates within an endwise-movable casing consisting of a bottom member 9 and an upper member 10, both members being bowed laterally to form a substantially cylindrical casing, which is open at opposite ends. The lower or bottom section is formed of metal and has the opposite outwardly-directed longitudinal flanges 11ª, which are slidably supported upon the respective sides of the supporting-frame, and the top section is also of metal and has a corresponding flange 12 to lie upon one of the bottom flanges, the opposite edge of the top member being hinged to the other flange 11ª, as indicated at 13. Suitable detachable fastenings 14 connect the flanges 11ª and 12, whereby the top may be thrown backwardly upon its hinged connection to expose the spiral feed-roller. As shown in Figs. 1 and 3, it will be observed that the bottom of the casing is in the form of a grating consisting of a plurality of cross-bowed bars 15, which have their opposite edges beveled to form cutting edges 11 at the inner sides of the bars, which inner sides fit close to the marginal edge of the feed-roller, so that by reciprocating the casing to move the cutting-bars thereof back and forth across the cutting edges of the spiral feed-roller the fruit-stems will be cut by a shear cut, so as to obviate damage to the fruit, as would ensue through a pull on the stems.

For reciprocating the knife-frame there is provided a transverse or counter-shaft 16, mounted upon the opposite sides of the frame and located between the end piece 1 and the spiral feed-roller. The opposite ends of this shaft are provided with corresponding crank-arms 17, that are connected to the respective sides of the knife-frame by means of the connecting rods or links 18, that are pivotally connected to the opposite lateral projections 19 upon the casing. Any suitable means may be used for driving the counter-shaft 16 from the shaft 6.

At the end 2 of the supporting-frame there is provided a hopper 22, which is supported between two uprights 23, rising from the frame, there being a cross-bar 24 piercing the hopper and connecting the uprights. The hopper has a rotatable conical bottom 25, which is provided with an upstanding journal 26, pivoted in the cross-bar 24, and a pendent journal 27, mounted in a bearing upon the adjacent end piece, there being a beveled gear 28 upon the journal 27 and in mesh with a beveled gear 29 upon the outer end of the journal 7, whereby the conical bottom is rotated within the stationary hopper. A plurality of radial agitator-arms 30 are carried by the journal 26 for the purpose of agitating the loose fruit within the hopper, and thereby cause the same to feed freely to the spiral roller. The bottom portion of the inner side of the hopper is provided with a discharge-opening 31, which is controlled by means of an adjustable slide or closure 32, which has a longitudinal slot 33 for the reception of an adjustable fastening 34 carried by the hopper. An open-bottomed hood 35 embraces the discharge-opening of the hopper and the adjacent end portion of the spiral feed device and is carried by the adjacent end of the supporting-frame, so that as the berries drop out of the hopper they drop downwardly into the spiral groove of the roller and are then carried forwardly to have their stems cut off by the reciprocatory knife-frame.

What is claimed is—

1. The combination of a revoluble element having a peripheral spirally-disposed feed-channel, and a coacting cutter disposed against one side of said revoluble element, to retain fruit in said channel until it reaches the discharge end thereof and cut off the projecting stems of the fruit during its passage through the channel, said cutter comprising a plurality of transversely-disposed bars spaced apart and having cutting edges, substantially as described.

2. The combination of a revoluble element having a peripheral spirally-disposed feed-channel, and a coacting cutting element, to retain fruit in said channel until it reaches the discharge end thereof and cut off the projecting stems of the fruit during its passage through the channel, said cutter comprising a plurality of transversely-disposed bars spaced apart and having cutting edges, and means to move one of said elements longitudinally, substantially as described.

3. The combination of a revoluble element having a peripheral spirally-disposed feed-channel, and a coacting cutter disposed against one side of said revoluble element, to retain fruit in said channel until it reaches the discharge end thereof and cut off the projecting stems of the fruit during its passage through the channel, said cutter comprising a plurality of transversely-disposed bars spaced apart and having cutting edges, and means to impart reciprocatory longitudinal movement to one of said elements, substantially as described.

4. The combination of a revoluble element having a peripheral spirally-disposed feed-channel, a coacting cutter disposed against one side of said revoluble element, to retain fruit in said channel until it reaches the discharge end thereof and cut off the projecting stems of the fruit during its passage through the channel, said cutter comprising a plurality of transversely-disposed bars spaced apart and having cutting edges, and means to feed fruit to the channel, substantially as described.

5. In a machine of the class described, the combination of a feed element having a feed-channel open on one side, and a coacting cutting element disposed against the open side of said channel, one of said elements being movable to urge fruit through the channel, said cutter comprising a plurality of transversely-disposed bars spaced apart and having cutting edges, whereby the projecting stems of the fruit will be cut off, substantially as described.

6. In a machine of the class described, the combination of a feed element, having a feed-channel open on one side, a coacting cutting element disposed against the open side of said feed-channel, said cutter comprising a plurality of transversely-disposed bars spaced apart and having cutting edges, and means to move one of said elements so that said cutting element crosses said channel, to cut off fruit-stems projecting therefrom, substantially as described.

7. A stemming-machine, comprising a frame, a rotatable spiral feed-roller mounted thereon, a reciprocatory bowed cutting device embracing the feed-roller, means for operating the feed-roller, and an operative connection between the feed-roller and the cutting device for reciprocating the latter.

8. A stemming-machine, comprising an open substantially horizontal frame, an intermediate longitudinal spiral feed-roller rotatably mounted within the frame, a reciprocatory cutting device embracing the lower side of the roller and slidably mounted upon the frame, a removable cover embracing the top of the roller and carried by the cutting device, a transverse shaft mounted upon the frame and having opposite terminal crank-arms, connecting-links between the crank-arms and the cutting device, and an operative connection between the shaft and the feed-roller.

9. In a stemming-machine, the combination with a rotatable spiral feed device, of a reciprocatory cutting device embracing the feed device and having a plurality of bowed cutting-bars provided with cutting edges.

10. In a stemming-machine, the combination with a frame, of a rotatable spiral feed device, and a reciprocatory cutting device, comprising a knife-frame having opposite flanges slidably mounted upon the frame, and transverse bowed knife-bars embracing one side of the feed device and having their opposite edges beveled to cutting edges.

In testimony that I claim the foregoing as my own I have hereto affixed my signature in the presence of two witnesses.

JAMES A. NORTH.

Witnesses:
 EMANUEL REAM,
 GEORGE G. DAUGHERTY.